(12) United States Patent
Iguchi

(10) Patent No.: US 10,964,477 B2
(45) Date of Patent: Mar. 30, 2021

(54) DIELECTRIC COMPOSITION AND ELECTRONIC COMPONENT

(71) Applicant: TDK CORPORATION, Tokyo (JP)

(72) Inventor: Toshihiro Iguchi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/558,542

(22) Filed: Sep. 3, 2019

(65) Prior Publication Data

US 2020/0090869 A1 Mar. 19, 2020

(30) Foreign Application Priority Data

Sep. 13, 2018 (JP) .............................. JP2018-171827

(51) Int. Cl.
*H01G 4/12* (2006.01)
*C04B 35/495* (2006.01)
*C04B 35/626* (2006.01)
*C04B 35/634* (2006.01)
*C04B 35/64* (2006.01)
*H01B 3/12* (2006.01)
*H01G 4/30* (2006.01)

(52) U.S. Cl.
CPC ......... *H01G 4/1263* (2013.01); *C04B 35/495* (2013.01); *C04B 35/6262* (2013.01); *C04B 35/6264* (2013.01); *C04B 35/62645* (2013.01); *C04B 35/63416* (2013.01); *C04B 35/64* (2013.01); *H01B 3/12* (2013.01); *C04B 2235/3215* (2013.01); *C04B 2235/3218* (2013.01); *C04B 2235/3222* (2013.01); *C04B 2235/3255* (2013.01); *C04B 2235/604* (2013.01); *C04B 2235/6562* (2013.01); *C04B 2235/6567* (2013.01); *C04B 2235/77* (2013.01); *H01G 4/30* (2013.01)

(58) Field of Classification Search
CPC ... C04B 35/495; H01G 4/1263; H01G 4/1254
See application file for complete search history.

(56) References Cited

U.S. PATENT DOCUMENTS

| | | | | |
|---|---|---|---|---|
| 10,354,799 B2* | 7/2019 | Nomura | .................... | H01G 4/30 |
| 10,513,464 B2* | 12/2019 | Akiba | .................. | H01G 4/1254 |
| 2019/0115154 A1* | 4/2019 | Aman | .................... | C04B 35/495 |
| 2019/0256425 A1* | 8/2019 | Akiba | ...................... | H01B 3/12 |
| 2020/0303122 A1* | 9/2020 | Iguchi | ................. | C04B 35/6262 |

FOREIGN PATENT DOCUMENTS

JP H03-274607 A 12/1991

* cited by examiner

*Primary Examiner* — Karl E Group
(74) *Attorney, Agent, or Firm* — Oliff PLC

(57) ABSTRACT

A dielectric composition comprising a complex oxide represented by a general formula of $A_aB_bC_4O_{15+\alpha}$ and an oxide including aluminum, in which "A" at least includes Ba, "B" at least includes Zr, and "C" at least includes Nb, "a" is 2.50 or more and 3.50 or less, and "b" is 0.50 or more, and 1.50 or less.

4 Claims, 1 Drawing Sheet

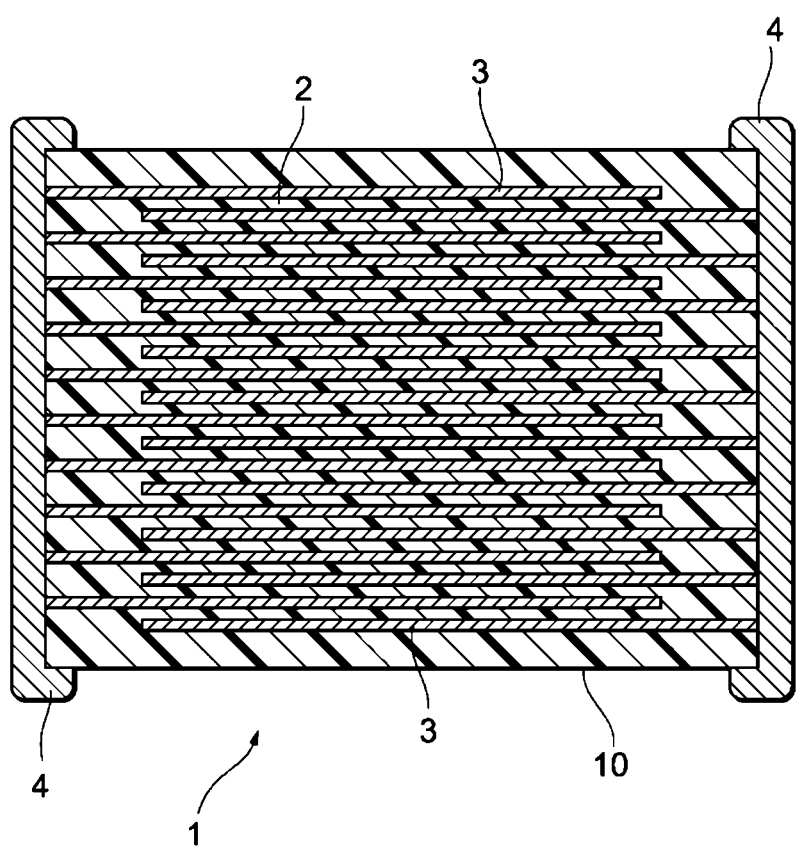

DIELECTRIC COMPOSITION AND ELECTRONIC COMPONENT

BACKGROUND OF THE INVENTION

The present invention relates to a dielectric composition and an electronic component having a dielectric layer constituted from the dielectric composition.

An electronic circuit and a power supply circuit which are incorporated to an electronic device are mounted with many electronic components such as a multilayer ceramic capacitor which uses a dielectric property of dielectrics. As a material constituting the dielectrics of such electronic component (dielectric material), a barium titanate based dielectric composition is widely used.

However, recently the electronic component has been used for many purposes, and it is demanded that the electronic component sufficiently functions even under high voltage environment. However, under such environment, the dielectric property of the barium titanate based dielectric composition decreases; hence the barium titanate based dielectric composition cannot sufficiently correspond to the environment. Therefore, it is demanded that the dielectric composition can exhibit a high dielectric property even when used under such environment.

As a dielectric composition other than the barium titanate based dielectric composition, Patent Document 1 discloses a ferrodielectric material represented by a general formula of $Ba_6Ti_2Nb_8O_{30}$ in which part of Ba, Ti, and Nb are substituted by other elements.

Patent Document 1: JP Patent Application Publication No. H03-274607

SUMMARY OF THE INVENTION

However, the dielectric composition disclosed in the Patent Document 1 had a low specific permittivity when it was used under high electric field intensity.

Also, in some case, stress is applied to the electronic component, which is mounted on a circuit board, due to deformation such as winding and the like of the circuit board. Thus, a high mechanical strength is demanded for the dielectric composition.

The present invention is attained in view of such circumstances, and the object is to provide a dielectric composition having a high mechanical strength and a high specific permittivity under high electric field intensity; and also to provide an electronic component having a dielectric layer constituted from the dielectric composition.

In order to attain the above object, the dielectric composition of the present invention is

[1] a dielectric composition having a complex oxide represented by a general formula of $A_aB_bC_4O_{15+\alpha}$ and an oxide including aluminum, in which "A" at least includes Ba, "B" at least includes Zr, and "C" at least includes Nb, "a" is 2.50 or more and 3.50 or less, and "b" is 0.50 or more and 1.50 or less.

[2] The dielectric composition according to [1], wherein the general formula is represented by $(Ba_{1-x}A1_x)_a(Zr_{1-y}B1_y)_b(Nb_{1-z}C1_z)_4O_{15+\alpha}$, in which "A1" includes one or more selected from the group consisting of Mg, Ca, and Sr, "B1" includes one or more selected from the group consisting of Ti and Hf, "C1" includes Ta, "x" is 0.50 or less, "y" is 0.50 or less, and "z" is 0.50 or less.

[3] The dielectric composition according to [1] or [2], wherein the oxide including aluminum (aluminum oxides) is a complex oxide including Ba.

[4] The dielectric composition according to any one of [1] to [3], wherein a density of the dielectric composition is 4.40 g/cm$^3$ or more.

[5] An electronic component comprising a dielectric layer including the dielectric composition according to any one of [1] to [4], and an electrode layer.

According to the present invention, the dielectric composition having a high mechanical strength and a high specific permittivity under high electric field intensity can be provided and also the electronic component having the dielectric layer constituted from the dielectric composition can be provided.

BRIEF DESCRIPTION OF DRAWINGS

The FIGURE is a cross section of a multilayer ceramic capacitor according to an embodiment of the present invention.

DETAILED DESCRIPTION OF THE INVENTION

Hereinafter, the present invention is described in detail based on a specific embodiment in the following order.
1. Multilayer Ceramic Capacitor
   1.1 Overall Constitution of Multilayer Ceramic Capacitor
   1.2 Dielectric Layer
   1.3 Internal Electrode Layer
   1.4 External Electrode
2. Dielectric Composition
   2.1 Complex oxide
   2.2 Oxides of Al (Aluminum oxides)
3. Method of Producing Multilayer Ceramic Capacitor
4. Effects in Present Embodiment
5. Modified Example

1. Multilayer Ceramic Capacitor (1.1 Overall Constitution of Multilayer Ceramic Capacitor)

A multilayer ceramic capacitor 1 as an example of an electronic component according to the present embodiment is shown in the FIGURE. The multilayer ceramic capacitor 1 has an element body 10 in which a dielectric layer 2 and an internal electrode layer 3 are stacked in alternating manner. At both ends of this element body 10, a pair of external electrodes 4 is formed which connects to each internal electrode 3 placed alternatingly in the element body 10. A shape of the element body 10 is not particularly limited, and usually it is rectangular parallelepiped shape. Also, a size of the element body 10 is not particularly limited, and it may be any appropriate size depending on the purpose of use.

(1.2 Dielectric Layer)

The dielectric layer 2 is constituted from a dielectric composition according to the present embodiment described in below. As a result, the multilayer ceramic capacitor having the dielectric layer 2 has a high mechanical strength and can exhibit a high specific permittivity (for example 200 or more) even when high electric field (for example 25 V/μm) is applied.

A thickness per one layer of the dielectric layer 2 (thickness of a layer) is not particularly limited, and it can be set to any thickness depending on desired properties and the purpose of use. Usually, a thickness of layer is preferably 100 Lm or less and more preferably 30 Lm or less. In the present embodiment, also the number of stacked dielectric layers is not particularly limited, and in the present embodiment, it is preferably 20 or more.

(1.3 Internal Electrode Layer)

In the present embodiment, the internal electrode layer 3 is stacked so that each end face is exposed alternatingly to two opposing end surfaces of the element body 10.

The conductive material included in the internal electrode layer 3 is not particularly limited, and when it is fired at the same time with the dielectric layer, known precious metals such as Pd, Pt, Ag—Pd alloy, and the like are preferably used. Also, when the internal electrode layer 3 is formed by a spattering and the like, or when the internal electrode layer 3 is formed after firing the dielectric layer, known base metals can be used as the conductive material. A thickness of the internal electrode layer 3 may be determined accordingly depending on the purpose of use.

(1.4 External Electrode)

A conductive material included in the external electrode 4 is not particularly limited. For example, known conductive materials such as Ni, Cu, Sn, Ag, Pd, Pt, Au, alloy of these, or conductive resins may be used. A thickness of the external electrode 4 may be determined accordingly depending on the purpose of use.

2. Dielectric Composition

The dielectric composition according to the present embodiment includes oxides of aluminum (aluminum oxides) and a complex oxide including at least Ba, Zr, and Nb. The complex oxide is a main component of the dielectric composition. Specifically, 80 mass % or more and preferably 90 mass % or more of the complex oxide is included in 100 mass % of the dielectric composition according to the present embodiment.

Also, the dielectric composition has main component grains constituted from the above mentioned complex oxide and grain boundaries existing between the main component grains. The grain boundaries include the above mentioned oxides of aluminum, components diffused from the main component, and the like.

An average grain size of the main component grains is preferably within the range of 0.01 to 4 μm. Also, the average grain size of the main component grains is more preferably 0.1 μm or more. On the other hand, the average grain size of the main component grains is more preferably 1 μm or less. By having the average grain size of the main component grains within the above mentioned range, the dielectric composition having a high mechanical strength tends to be easily obtained.

In the present embodiment, the average grain size of the main component grains is an average value of a code diameter calculated from a code method. Specifically, an arbitrary straight line is drawn on a photograph with the main component grains in it and the length of the straight line is divided by the number of intersection points of the straight line and grain boundaries, thereby the code diameter is calculated. The code diameter is calculated for ten or so of the straight lines, and the average value thereof is determined as the average grain size of the main component grains.

(2.1 Complex Oxide)

Elements other than oxygen included in the complex oxide are separated into three element groups (that is into "A", "B", and "C") based on valence of the elements, and the complex oxide is represented by a general formula of $A_aB_bC_4O_{15+\alpha}$.

"A" represents divalent elements and Ba is included. "B" represents tetravalent elements and Zr is included. "C" represents pentavalent elements and Nb is included. Also, "a" of the general formula represents a ratio of the number of "A" atoms when 4 atoms of elements constituting "C" are included in the general formula, and "b" of the general formula represents a ratio of the number of "B" atoms when 4 atoms of elements constituting "C" are included in the general formula.

In the present embodiment, the complex oxide is a relaxor ferrodielectric and the complex oxide is based on a complex oxide represented by the general formula of $A_3B_1C_4O_{15}$. In this complex oxide, "B" and "C" having different valances occupy predetermined sites of a crystal structure of the complex oxide in a predetermined ratio. Due to heterogeneity caused by local structure formed as mentioned in above, it is thought that the predetermined dielectric properties can be attained.

The complex oxide represented by a general formula of $A_3B_1C_4O_{15}$ has high compositional flexibility, and ratios of the number atoms constituting "A", "B", and "C" can deviate to some degree from a stoichiometric ratio. Thus, when the number of "C" atoms included in the general formula is four; "a" and "b" have predetermined ranges.

In the present embodiment, "a" is 2.50 or more and preferably 2.70 or more. Also, "a" is 3.50 or less and preferably 3.30 or less.

Also, in the present embodiment, "b" is 0.50 or more and preferably 0.70 or more. Also, "b" is 1.50 or less and preferably 1.30 or less.

When "a" and "b" are within the above mentioned ranges, the complex oxide represented by the general formula of $A_aB_bC_4O_{15+\alpha}$ exhibits suitable dielectric properties.

Note that, in the complex oxide of the present embodiment, an amount of oxygen (O) may change depending on a constitution ratio of "A", "B", and "C"; oxygen defects; and the like. Thus, in the present embodiment, the amount of oxygen deviated from a stoichiometric ratio is represented by "α" compared to a stoichiometric ratio of the complex oxide represented by the general formula of $A_3B_1C_4O_{15}$. A range of "α" is not particularly limited, and for example it may be about −1 or more and 1 or less.

In the present embodiment, "A" at least includes Ba and divalent elements A1 may be included besides Ba. "A1" preferably includes one or more selected from the group consisting of Mg, Ca, and Sr. In addition to Ba, when "A1" is included in "A", the complex oxide of the present embodiment can be represented by $(Ba_{1-x}A1_x)_aB_bC_4O_{15+\alpha}$. In this formula, "x" is preferably 0.00 or more. On the other hand, "x" is preferably 0.50 or less, and more preferably 0.25 or less. The preferable dielectric properties can be obtained even when "A1" is included in "A".

Note that, when Mg is included as "A1", a specific permittivity tends to decrease. Therefore, from the point of obtaining a high specific permittivity, a ratio of the number of Mg atoms is preferably 0.10 or less and more preferably 0.05 or less when the total number of atoms constituting "A" is 1.

Also, "B" at least includes Zr and tetravalent elements B1 may be included besides Zr. "B1" preferably includes one or more selected from the group consisting of Ti and Hf. When "B" includes "B1" in addition to Zr, the complex oxide according to the present embodiment can be represented by $A_a(Zr_{1-y}B1_y)_bC_4O_{15+\alpha}$. In the formula, "y" is preferably 0.00 or more. On the other hand, "y" is preferably 0.50 or less and more preferably 0.25 or less. The preferable dielectric properties can be obtained even when "B" includes "B1".

Note that, when Ti is included as "B1", a resistivity tends to decrease. Therefore, in the present embodiment, Ti is preferably included in a level which allows obtaining the effects of the present invention. Specifically, a ratio of the number of Ti atoms is preferably 0.20 or less and more preferably 0.10 or less when the total number of atoms constituting "B" is 1. From the point of obtaining a high resistivity, preferably Ti is substantially not included. Here, "Ti is substantially not included" means that Ti may be included as long as it is about an amount of inevitable impurity.

Also, "C" at least includes Nb and pentavalent elements C1 may be included besides Nb. Also, "C1" preferably includes Ta. When "C1" is included in "C" in addition to Nb, the complex oxide according to the present embodiment can be represented by a general formula of $A_aB_b(Nb_{1-z}C1_z)_4O_{15+\alpha}$. In this formula, "z" is preferably 0.00 or more. On the other hand, "z" is preferably 0.50 or less.

Note that, a ratio of the number of divalent element A1 atoms other than Mg, Ca, and Sr is preferably 0.10 or less when the total number of atoms constituting "A" is 1. A ratio of the number of tetravalent element B1 atoms other than Ti and Hf is preferably 0.10 or less when the total number of atoms constituting "B" is 1. A ratio of the number of pentavalent element C1 atoms other than Ta is preferably 0.10 or less when the total number of atoms constituting "C" is 1.

According to above, the general formula $A_aB_bC_4O_{15+\alpha}$ can be expressed as $(Ba_{1-x}A1_x)_a(Zr_{1-y}B1_y)_b(Nb_{1-z}C1_z)_4O_{15+}$. Here, "a", "b", "x", "y", "z", and "α" are within the above mentioned ranges.

(2.2 Oxides of Al (Aluminum Oxides))

The dielectric composition according to the present embodiment includes the oxide including aluminum (aluminum oxides) other than the above mentioned complex oxide. By having oxides of aluminum, the dielectric composition attains a high resistivity, and moreover good dielectric properties can be obtained even when high electric field intensity is applied. Further, by having oxides of aluminum, the average grain size of the main component grains constituted from the above mentioned complex oxide can be made small. As a result, the dielectric composition having a high mechanical strength tends to be obtained easily. As oxides of aluminum, for example $Al_2O_3$ (aluminum oxide) may be mentioned.

Oxides of aluminum mainly function as a sintering aid. That is, by having a raw material of oxides of aluminum in the raw material of the dielectric composition, sintering of the dielectric composition is facilitated during firing. Therefore, this allows lowering a firing temperature necessary to attain a sintering property which enables to exhibit sufficient properties. In other words, the density of the dielectric composition can be increased even when it is obtained by firing at the same temperature. In the present embodiment, the density of the dielectric composition is preferably 4.40 g/cm$^3$ or more and more preferably 4.70 g/cm$^3$ or more.

Also, as the sintering property of the dielectric composition improves, the dielectric properties of the dielectric composition also improve. Therefore, by including oxides of aluminum, even when the firing temperature is low, the density of the dielectric composition becomes high and as a result the dielectric properties such as a resistivity, a specific permittivity, and the like improve.

In the present embodiment, a content of oxides of aluminum is preferably 0.5 mass % or more and more preferably 1 mass % or more with respect to 100 mass % of the above mentioned complex oxide. On the other hand, the content of oxides of aluminum is preferably 20 mass % or less and more preferably 10 mass % or less with respect to 100 mass % of the above mentioned complex oxide.

Also, oxides of aluminum preferably include Ba, and more preferably it is a complex oxide including Al (aluminum) and Ba (barium). As the complex oxide which includes Al (aluminum) and Ba (barium), preferably the number of Ba (barium) atoms is fewer than the number of Al (aluminum) atoms. As such complex oxide, for example $0.82BaO.6Al_2O_3$, $1.32BaO.6Al_2O_3$, and $BaAl_2O_4$ may be mentioned; and preferably it is $1.32BaO.6Al_2O_3$.

Also, the dielectric composition according to the present embodiment may include other component besides the above mentioned complex oxide and oxides of aluminum as long as the effects of the present invention can be exhibited. A content of other component is preferably 20 mass % or less and more preferably 10 mass % or less in 100 mass % of the dielectric composition. Particularly, a total content of one or more components selected from the group consisting of $SiO_2$, MnO, CuO, and $Fe_2O_3$ is preferably 0.5 mass % or less in 100 mass % of the dielectric composition. Such component lowers the sintering property of the dielectric composition, and as a result, the dielectric properties and physical property of the dielectric composition are also decreased.

3. Method of Producing Multilayer Ceramic Capacitor

Next, an example of a method of producing the multilayer ceramic capacitor shown in the FIGURE is described in below.

The multilayer ceramic capacitor 1 according to the present embodiment can be produced by a same and known method for producing a conventional multilayer ceramic capacitor. As a known method, for example a method of producing the multilayer ceramic capacitor by forming and firing a green chip using a paste including a raw material of the dielectric composition may be mentioned as an example. Hereinafter, the method of producing the multilayer ceramic capacitor is described in detail.

First, a starting raw material of the dielectric composition is prepared. As the starting raw material, the complex oxide which constitutes the above mentioned dielectric composition can be used. Also, oxides of each metal included in the complex oxide can be used. Also, various compounds which become the components constituting the complex oxide by firing can be used. As various compounds, for example carbonates, oxalates, nitrates, hydroxides, organometallic compounds, and the like may be mentioned. Oxides, various compounds, and the like can be used as the raw material of oxides of aluminum as similar to the raw material of the complex oxide. In the present embodiment, the above mentioned starting raw materials are preferably powder.

Among the prepared starting raw materials, the raw material of the complex oxide is weighed so that it satisfies a predetermined ratio, and wet mixing is performed for a predetermined length of time using a ball mill and the like. After drying a mixed powder, a heat treatment is carried out in a temperature range of 700 to 1300° C. under air atmosphere, thereby a calcined powder of the complex oxide is obtained. Also, when oxides of aluminum are a complex oxide, the raw material of each component constituting the complex oxide is heat treated; thereby a calcined powder of oxides of aluminum is preferably obtained.

Next, a paste for producing a green chip is prepared. A dielectric layer paste is prepared by forming a paste by kneading the obtained calcined powder, a raw material powder of oxides of aluminum or a calcined powder of oxides of aluminum, a binder, and a solvent. As the binder and the solvent, any known binders and solvents may be used. Also, additives such as a plasticizer, a dispersant, and the like may be added to the dielectric layer paste if needed.

The internal electrode layer paste is obtained by kneading the above mentioned raw material of the conductive material, a binder, and a solvent. As the binder and the solvent, any known binders and solvents may be used. The internal electrode layer paste may include additives such as an inhibitor, a plasticizer, a dispersant, and the like if needed.

The external electrode paste can be prepared as same as the internal electrode layer paste.

Each paste obtained is used to form the green sheet and the internal electrode pattern, and these are stacked to obtain a green chip.

The obtained green chip is subjected to a binder removal treatment if necessary. A binder removal condition may be any known condition, and for example a holding temperature is preferably 200 to 350° C.

After the binder removal treatment, the green chip is fired to obtain an element body. In the present embodiment, the green chip is fired in air. Other firing condition may be any known condition, and for example a holding temperature is preferably 1200 to 1450° C.

The dielectric composition constituting the dielectric layer of the element body obtained as such is the dielectric composition mentioned in above. This element body is carried out with end face polishing, and the external electrode paste is coated and baked, thereby the external electrode 4 is formed. Then, if necessary, a coating layer is formed by plating and the like to the surface of the external electrode 4.

As such, the multilayer ceramic capacitor according to the present embodiment is produced.

4. Effects in the Present Embodiment

In the present embodiment, the dielectric composition includes oxides of aluminum and the complex oxide having above mentioned composition.

The complex oxide is a relaxor ferrodielectric, and it is expected to have higher specific permittivity under high electric field intensity than that of the barium titanate based dielectric. When the dielectric composition including the complex oxide as a main component is dense, such dielectric properties, physical property, and the like can be obtained sufficiently. However, when the dielectric composition is not dense, these properties tend to deteriorate even when the composition is the same.

Therefore, a sintering aid which promotes sintering of the complex oxide is important. As a sintering aid, $SiO_2$, MnO, and the like are often used, and in the present embodiment, the dielectric composition is sufficiently sintered since the dielectric composition includes oxides of aluminum. As a result, a high specific permittivity is attained especially under high electric field intensity. Also, since the dielectric composition includes oxides of aluminum, the average grain size of the main component grains can be made small. As a result, a high mechanical strength can be attained easily. On the other hand, even when the dielectric composition according to the present embodiment includes $SiO_2$, MnO, and the like, the dielectric composition does not sinter sufficiently, and the average grain size becomes large. As a result, the density of the dielectric composition is low and the dielectric properties and the physical property are not sufficient.

That is, the effects of the present invention can be attained by the combination of oxides of aluminum and the complex oxide having the above mentioned composition.

In order to attain such effects, Ba constituting "A" may be substituted by divalent elements "A1" in a predetermined ratio; Zr constituting "B" may be substituted by tetravalent elements "B1" in a predetermined ratio; Nb constituting "C" may be substituted by pentavalent elements "C1" in a predetermined ratio.

Further, when oxides of aluminum are a complex oxide including Al and Ba, the above mentioned effects further improve.

5. Modified Examples

In the above mentioned embodiment, the multilayer ceramic capacitor is described as an electronic component according to the present embodiment, but the electronic component according to the present embodiment is not limited to the multilayer ceramic capacitor, and it may be any electronic component as long as it includes the dielectric composition mentioned in above.

Also, in the above mentioned embodiment, the multilayer electronic component such as a multilayer ceramic capacitor is described as the electronic component, but it may be a single layer electronic component having one layer of dielectric layer.

Hereinabove, the embodiment of the present invention has been described, however the present invention is not to be limited thereto, and various modifications may be carried out within the scope of the present invention.

EXAMPLES

Hereinafter, the present invention is described in further detail based on examples and comparative examples. However, the present invention is not to be limited thereto.

Experiment 1

First, powders of barium carbonate ($BaCO_3$), calcium carbonate ($CaCO_3$), strontium carbonate ($SrCO_3$), magnesium oxide (MgO), zirconium oxide ($ZrO_2$), hafnium oxide ($HfO_2$), titanium oxide ($TiO_2$), niobium oxide ($Nb_2O_5$), and tantalum oxide ($Ta_2O_5$) were prepared as starting raw materials of a complex oxide which is a main component of a dielectric composition. Also, as a starting raw material of oxides of aluminum, powders of aluminum oxide ($Al_2O_3$) and barium carbonate ($BaCO_3$) were prepared. The prepared starting raw materials were weighed so that the fired dielectric composition satisfied the composition shown in Table 1. Note that, oxides of aluminum were weighed so that 5 mass % was included with respect to 100 mass % of the complex oxide.

Also, as a starting raw material of the complex oxide of comparative examples, powder of barium titanate ($BaTiO_3$) was prepared. Further, as a starting raw material of oxides of aluminum of the comparative examples, powders of silicon oxide ($SiO_2$), manganese oxide (MnO), copper oxide (CuO), and iron oxide ($Fe_2O_3$) were prepared. The prepared starting raw materials were weighed so that the fired dielectric composition satisfied the composition shown in Table 1. Note that, $SiO_2$ and the like were weighed so that so that 5 mass % thereof was included with respect to 100 mass % of the complex oxide.

Next, the weighed powders of the starting raw materials of the complex oxide were wet mixed for 16 hours by a ball mill using ion exchange water as a dispersant, then a mixture was dried; thereby a mixed raw material powder was obtained. Then, the obtained mixed raw material powder was heat treated under the condition of a holding time of 2 hours at a holding temperature of 900° C. in air atmosphere; thereby a calcined powder of the complex oxide was obtained.

Also, when oxides of aluminum were a complex oxide of Al and Ba, weighed powders of $Al_2O_3$ and $BaCO_3$ were wet mixed for 16 hours by a ball mill using ion exchange water as a dispersant, then a mixture was dried thereby a mixed raw material powder was obtained. Then, the obtained mixed powder was heat treated for a holding time of 2 hours at a holding temperature of 1300° C. in air atmosphere, thereby a calcined powder of oxides of aluminum was obtained.

To the obtained calcined powder of the complex oxide, the calcined powder of oxides of aluminum or the raw material powder of oxides of aluminum was added if needed and then it was weighed. Then, wet pulverized for 16 hours by a ball mill using ion exchange water as a dispersant, then a pulverized material was dried.

To 100 mass % of the dried pulverized powder, 10 mass % of aqueous solution including 6 mass % of polyvinyl alcohol resin as a binder was added for granulation, thereby a granulated powder was obtained.

The obtained granulated powder was put in a ϕ12 mm metal mold, and pre-press molding was performed at pressure of 0.6 ton/cm², then press molding was performed at pressure of 1.2 ton/cm², thereby a green molded article of circular disk shape was obtained.

The obtained green molded article was fired in air, and the sintered body of circular disk shape was obtained. The firing condition was a temperature rising rate of 200° C./h, a holding temperature of 1300° C., and a temperature holding time of 2 hours.

The density was measured as described in below. A diameter of the fired capacitor sample of circular disk shape was measured at three different places, thereby a diameter R was obtained. Next, the thickness of the capacitor sample of circular disk shape was measured at three different places; thereby a thickness h was obtained. Using the obtained R and h, a volume V ($=\frac{1}{4} \cdot \pi \cdot R^2 \cdot h$) of the capacitor sample of circular disk shape was calculated. Here, it is a ratio of a circle's circumference. Next, a mass m of the capacitor sample of circular disk shape was measured, and by calculating m/V, the density of the capacitor sample of circular disk shape was obtained. An average of the results of the density evaluated for three samples are shown in Table 1.

The surface of the obtained sintered body was mirror polished and thermal etching was carried out in air at a temperature rising rate of 200° C./h and a holding temperature of 1200° C. for a holding time of 2 hours. The surface of the sintered body was observed by SEM after thermal etching, then the main component grains were identified and a code diameter of the main component grains was measured.

Arbitrary lines were drawn on the photograph of the surface of the sintered body taken by SEM, and the number of grain boundaries crossing the lines was counted. Then, by dividing a length of line with the number of grain boundaries, the code diameter was calculated. Ten lines were drawn, and the code diameter was measured for each of the lines. The average value of the measured code diameters was defined as the average grain size of the main component grains. The average grain size is shown in Table 1.

In—Ga alloy was coated to both main faces of a sintered body which is different from the sintered body used to measure a code diameter, and a pair of electrodes was formed, thereby a sample of the ceramic capacitor of circular disk shape was obtained.

A digital resistance meter (R8340 made by ADVANTEST) was used to a capacitor sample of circular disk shape, and an insulation resistance was measured at standard temperature (25° C.). The obtained insulation resistance, an effective electrode area, and a thickness of the dielectric layer were used to calculate a resistivity. The higher the resistivity was, the more preferable it was, and in the present examples, the resistivity of $1.0 \times 10^9$ (Ω·m) or more was considered good. The results are shown in Table 1.

Next, a sample for measuring a specific permittivity was produced. To the calcined powder of the complex oxide prepared in the above, the calcined powder of oxides of aluminum or the raw material powder of oxides of aluminum were added if needed; thereby a raw material powder of the dielectric composition was obtained. The obtained raw material powder of the dielectric composition, a binder, and a solvent were mixed to form a paste. A green sheet was formed using the obtained paste, and Pd electrode was printed on the green sheet, then a binder removal treatment was performed. Then, it was fired in air and the multilayer ceramic capacitor sample was produced. Distance between the Pd electrodes (thickness of the dielectric layer) was 5 μm, and four layers of the dielectric layers were stacked.

To the obtained multilayer ceramic sample, at a standard temperature (25° C.), the specific permittivity was evaluated by comparing a case of applying DC voltage and a case of not applying DC voltage. First, a signal having a frequency of 1 kHz and an input signal level (measuring voltage) of 1 Vrms was input using a digital LCR meter (4284A made by YHP), thereby a capacitance was measured. Then, when DC voltage was not applied, that is the specific permittivity (no unit) when the electric field intensity was 0 V/μm was calculated from a measured capacitance a thickness of the dielectric layer and an effective electrode area. Next, while DC voltage was applied so that the electric field intensity was 25 V/μm, a capacitance was measured under the above mentioned measuring condition. The specific permittivity when the electric field intensity was 25 V/μm was calculated from the obtained capacitance. The higher the specific permittivity was, the more preferable it was, and in the present examples, the sample having a specific permittivity of 200 or more when the electric field intensity was 25 V/μm was considered good. Results are shown in Table 1.

Also, the mechanical strength of the dielectric composition was measured as described in below. The obtained granulated powder was put in a metal mold having a size of 5×53 mm, then pre-press molding was performed at pressure of 0.6 ton/cm². Then, press molding was performed at pressure of 1.2 ton/cm²; thereby a green molded article was produced. The obtained green molded article was fired in air, thereby a sintered body of which a cross section was a rectangular parallelepiped shape was obtained. The firing condition was a temperature rising rate of 200° C./h, a holding temperature of 1300° C., and a holding time of 2 hours.

The obtained sintered body was processed into a size of a total length of 36 mm or more and less than 45 mm, width of 4.0±0.1 mm, and thickness of 3.0±0.1 mm, and chamfering was performed to obtain a test sample. To ten of the test samples obtained from each sample, a three-point bending test was performed based on a testing method according to JIS R 1601. In the present examples, a sample having an average value of three-point bending strength of 40 MPa or more was considered good (○), and a sample having less than 40 MPa was considered poor (x). The results are shown in Table 1.

On the other hand, the samples including $SiO_2$, MnO, CuO, or $Fe_2O_3$ which is widely used as a sintering aid had poor resistivity, specific permittivity, density, and three-point bending strength compared to the samples which included oxides of aluminum. Also, the barium titanate based dielectric composition had a large specific permittivity when DC voltage was not applied, but a specific permittivity significantly decreased when DC voltage was applied compared to the sample which included oxides of aluminum.

TABLE 1

| Sample No. | Complex oxide $Ba_aZr_bNb_4O_{15+\alpha}$ a | b | Additives | Resistivity [Ωm] | Specific permittivity at 0 V/μm | Specific permittivity at 25 V/μm | Density [g/cm³] | Ave. grain size [μm] | Three-point bending test evaluation |
|---|---|---|---|---|---|---|---|---|---|
| Comparative example 1 | 3.12 | 1.28 | None | 1.4E+08 | 141 | 90 | 3.8 | 4.5 | x |
| Example 1 | 3.12 | 1.28 | $Al_2O_3$ | 9.0E+09 | 264 | 210 | 4.5 | 0.8 | ○ |
| Example 2 | 3.12 | 1.28 | $0.82BaO \cdot 6Al_2O_3$ | 2.0E+11 | 344 | 260 | 4.9 | 0.8 | ○ |
| Example 3 | 3 12 | 1.28 | $1.32BaO \cdot 6Al_2O_3$ | 3.5E+11 | 359 | 270 | 5.0 | 0.8 | ○ |
| Example 4 | 3.12 | 1.28 | $BaAl_2O_4$ | 5.1E+10 | 306 | 260 | 4.7 | 0.7 | ○ |
| Comparative example 2 | 3.12 | 1.28 | $SiO_2$ | 2.1E+08 | 183 | 80 | 3.8 | 55.3 | x |
| Comparative example 3 | 3.12 | 1.28 | MnO | 1.7E+08 | 156 | 88 | 3.7 | 11.1 | x |
| Comparative example 4 | 3.12 | 1.28 | CuO | 4.5E+08 | 177 | 92 | 3.8 | 15.2 | x |
| Comparative example 5 | 3.12 | 1.28 | $Fe_2O_3$ | 3.0E+08 | 136 | 70 | 3.6 | 48.2 | x |
| Comparative example 6 | 2.88 | 0.72 | None | 1.4E+08 | 356 | 190 | 3.8 | 5.2 | x |
| Example 5 | 2.88 | 0.72 | $Al_2O_3$ | 9.4E+09 | 647 | 240 | 4.5 | 0.8 | ○ |
| Example 6 | 2.88 | 0.72 | $0.82BaO \cdot 6Al_2O_3$ | 9.8E+10 | 809 | 280 | 4.8 | 0.9 | ○ |
| Example 7 | 2.88 | 0.72 | $1.32BaO \cdot 6Al_2O_3$ | 4.0E+11 | 908 | 310 | 5.1 | 0.9 | ○ |
| Example 8 | 2.88 | 0.72 | $BaAl_2O_4$ | 6.2E+10 | 778 | 260 | 4.8 | 0.8 | ○ |
| Comparative example 7 | 2.88 | 0.72 | $SiO_2$ | 3.5E+08 | 418 | 121 | 3.9 | 51.2 | x |
| Comparative example 8 | $BaTiO_3$ | | None | 8.0E+07 | 1602 | 80 | 5.9 | 1.1 | x |
| Comparative example 9 | $BaTiO_3$ | | $SiO_2$ | 4.2E+07 | 1440 | 90 | 5.9 | 11.5 | x | aE + b shown in the column of Resistivity indicates "a × 10$^b$"

According to Table 1, the samples including oxides of aluminum and the complex oxide having ratios of the number of Ba and Zr atoms with respect to the numbers of Nb atoms within the above mentioned ranges relative to the stoichiometric composition of the complex oxide represented by a compositional formula of $Ba_3ZrNb_4O_{15}$ had better resistivity, specific permittivity, density, and three-point bending strength than the samples which did not include oxides of aluminum. Also, as oxides of aluminum, the complex oxide of Al and Ba was confirmed to be better than $Al_2O_3$.

Experiment 2

A capacitor sample of circular disk shape was produced by the same method as Experiment 1 except for weighing starting raw materials so that a fired dielectric composition satisfied the composition shown in Table 2. Also, to the produced capacitor sample having circular disk shape, a resistivity, a specific permittivity when DC voltage was not applied, a density, an average grain size, and a three-point bending strength were evaluated by the same method as Experiment 1. Results are shown in Table 2.

TABLE 2

| Sample No. | Complex oxide $Ba_aZr_bNb_4O_{15+\alpha}$ a | b | Additives | Resistivity [Ωm] | Specific permittivity | Density [g/cm³] | Ave. grain size [μm] | Three-point bending test evaluation |
|---|---|---|---|---|---|---|---|---|
| Comparative example 10 | 3.12 | 0.72 | None | 7.6E+07 | 311 | 3.7 | 5.1 | x |
| Example 9 | 3.12 | 0.72 | $Al_2O_3$ | 5.9E+09 | 630 | 4.4 | 0.8 | ○ |
| Example 10 | 3.12 | 0.72 | $0.82BaO \cdot 6Al_2O_3$ | 5.2E+10 | 765 | 4.7 | 0.9 | ○ |
| Example 11 | 3.12 | 0.72 | $1.32BaO \cdot 6Al_2O_3$ | 6.2E+11 | 938 | 5.1 | 0.8 | ○ |

TABLE 2-continued

| Sample No. | Complex oxide $Ba_aZr_bNb_4O_{15+\alpha}$ | | Additives | Properties | | | | |
|---|---|---|---|---|---|---|---|---|
| | a | b | | Resistivity [$\Omega$m] | Specific permittivity | Density [g/cm$^3$] | Ave. grain size [μm] | Three-point bending test evaluation |
| Example 12 | 3.12 | 0.72 | BaAl$_2$O$_4$ | 1.4E+11 | 834 | 4.9 | 0.9 | ○ |
| Comparative example 11 | 3.12 | 0.72 | SiO$_2$ | 2.8E+08 | 402 | 3.9 | 60.5 | x |
| Comparative example 12 | 2.88 | 1.28 | None | 9.3E+07 | 325 | 3.7 | 4.5 | x |
| Example 13 | 2.88 | 1.28 | Al$_2$O$_3$ | 6.9E+09 | 625 | 4.4 | 0.8 | ○ |
| Example 14 | 2.88 | 1.28 | 0.82BaO•6Al$_2$O$_3$ | 7.6E+10 | 792 | 4.8 | 0.7 | ○ |
| Example 15 | 2.88 | 1.28 | 1.32BaO•6Al$_2$O$_3$ | 6.9E+11 | 945 | 5.1 | 0.9 | ○ |
| Example 16 | 2.88 | 1.28 | BaAl$_2$O$_4$ | 1.7E+10 | 689 | 4.5 | 0.8 | ○ |
| Comparative example 13 | 2.88 | 1.28 | SiO$_2$ | 2.9E+08 | 405 | 3.9 | 45.3 | x |
| Example 17 | 3.00 | 1.00 | 1.32BaO•6Al$_2$O$_3$ | 9.5E+11 | 968 | 5.2 | 0.8 | ○ | aE + b shown in the column of Resistivity indicates "a × 10$^b$"

According to Table 2, when "a" and "b" were changed within the above mentioned ranges, a specific permittivity improved while maintaining high resistivity and mechanical strength.

Experiment 3

Regarding the sample of Example 3, a capacitor sample of circular disk shape was produced by the same method as Experiment 1 except for weighing starting raw materials so that a fired dielectric composition satisfied the composition shown in Table 3. Also, to the produced ceramic capacitor sample of circular disk shape, a density, an average grain size, and a three-point bending strength were evaluated by the same method as Experiment 1. Results shown in Table 3.

According to Table 3, even when Ba, Zr, and Nb were substituted by the above mentioned elements in above mentioned ratios, the density was about the same and was able to maintain a high mechanical strength.

Experiment 4

A capacitor sample of circular disk shape was produced by the same method as Experiment 1 except for weighing starting raw materials so that a fired dielectric composition satisfied the composition shown in Table 4. Also, to the produced capacitor sample having circular disk shape, a resistivity, a specific permittivity when DC voltage was not applied, a density, an average grain size, and a three-point bending strength were evaluated by the same method as Experiment 1. Results are shown in Table 4.

TABLE 3

| Sample No. | Complex oxide $(Ba_{1.00-x}A1_x)_a(Zr_{1.00-y}B1_y)_b(Nb_{1.00-z}C1_z)_4O_{15+\alpha}$ | | | | | | | Oxides of aluminum | Properties | | |
|---|---|---|---|---|---|---|---|---|---|---|---|
| | | A1 | | | B1 | | C1 | | Density [g/cm$^3$] | Ave. grain size [μm] | Three-point bending test evaluation |
| | a | Element | x | b | Element | y | Element | z | | | |
| Example 18 | 3.12 | Ca | 0.25 | 1.28 | — | 0.00 | — | 0.00 | 1.32BaO•6Al$_2$O$_3$ | 5.0 | 0.7 | ○ |
| Example 19 | 3.12 | Sr | 0.25 | 1.28 | — | 0.00 | — | 0.00 | 1.32BaO•6Al$_2$O$_3$ | 5.1 | 0.6 | ○ |
| Example 20 | 3.12 | Sr | 0.50 | 1.28 | — | 0.00 | — | 0.00 | 1.32BaO•6Al$_2$O$_3$ | 5.0 | 0.7 | ○ |
| Example 21 | 3.12 | Ca | 0.50 | 1.28 | — | 0.00 | — | 0.00 | 1.32BaO•6Al$_2$O$_3$ | 5.1 | 0.6 | ○ |
| Example 22 | 3.12 | — | 0.00 | 1.28 | Hf | 0.50 | — | 0.00 | 1.32BaO•6Al$_2$O$_3$ | 5.2 | 0.7 | ○ |
| Example 23 | 3.12 | — | 0.00 | 1.28 | — | 0.00 | Ta | 0.50 | 1.32BaO•6Al$_2$O$_3$ | 5.1 | 0.6 | ○ |

TABLE 4

| | Complex oxide $(Ba_{1.00-x}Al_x)_a(Zr_{1.00-y}B1_y)_b(Nb_{1.00-z}C1_z)_4O_{15+\alpha}$ | | | | | | | | | Properties | | | |
|---|---|---|---|---|---|---|---|---|---|---|---|---|---|
| | | A1 | | | B1 | | C1 | | Oxides of | Density | Ave. grain size | Three-point bending test | Specific permit- | Resis- tivity |
| Sample No. | a | Element | x | b | Element | y | Element | z | aluminum | [g/cm³] | [μm] | evaluation | tivity | [Ωm] |
| Example 24 | 3.30 | — | 0.00 | 1.30 | — | 0.00 | — | 0.00 | 1.32BaO•6Al₂O₃ | 5.2 | 0.7 | ○ | 302 | 4.00E+11 |
| Example 25 | 3.50 | — | 0.00 | 1.50 | — | 0.00 | — | 0.00 | 1.32BaO•6Al₂O₃ | 5.0 | 0.7 | ○ | 205 | 9.00E+11 |
| Example 26 | 2.70 | — | 0.00 | 0.70 | — | 0.00 | — | 0.00 | 1.32BaO•6Al₂O₃ | 5.2 | 0.6 | ○ | 830 | 8.00E+09 |
| Example 27 | 2.50 | — | 0.00 | 0.50 | — | 0.00 | — | 0.00 | 1.32BaO•6Al₂O₃ | 5.0 | 0.6 | ○ | 892 | 1.20E+09 |
| Example 28 | 3.12 | Mg | 0.05 | 1.28 | — | 0.00 | — | 0.00 | 1.32BaO•6Al₂O₃ | 5.0 | 0.8 | ○ | 302 | 1.20E+11 |
| Example 29 | 3.12 | Mg | 0.10 | 1.28 | — | 0.00 | — | 0.00 | 1.32BaO•6Al₂O₃ | 5.0 | 0.9 | ○ | 210 | 9.00E+10 |
| Example 30 | 3.12 | — | 0.00 | 1.18 | Ti | 0.10 | — | 0.00 | 1.32BaO•6Al₂O₃ | 5.0 | 0.8 | ○ | 370 | 9.00E+09 |
| Example 31 | 3.12 | — | 0.00 | 1.08 | Ti | 0.20 | — | 0.00 | 1.32BaO•6Al₂O₃ | 5.0 | 0.9 | ○ | 392 | 1.10E+09 | aE + b shown in the column of Resistivity indicates "a × 10^b"

According to Table 4, when "a" and "b" were changed within the above mentioned ranges or when Ba, Zr, and Nb were substituted by the above mentioned elements in the above mentioned ratios, high resistivity and mechanical strength were maintained.

In the present embodiment, the resistivity of a so-called single layer ceramic capacitor was evaluated, but the multilayer ceramic capacitor in which the dielectric layer and the internal electrode are stacked exhibits a similar resistivity as the capacitor sample of the present examples.

NUMERICAL REFERENCES

1 . . . Multilayer ceramic capacitor
10 . . . Element body
2 . . . Dielectric layer
3 . . . Internal electrode layer
4 . . . External electrode

What is claimed is:

1. A dielectric composition comprising a complex oxide represented by a formula of $A_aB_bC_4O_{15+\alpha}$ and an oxide including aluminum, in which "A" at least includes Ba, "B" at least includes Zr, and "C" at least includes Nb, "a" is 2.50 or more and 3.50 or less, and "b" is 0.50 or more and 1.50 or less, wherein the oxide including aluminum is a complex oxide including Ba.

2. The dielectric composition according to claim 1, wherein the formula is represented by $(Ba_{1-x}Al_x)_a(Zr_{1-y}B1_y)_b(Nb_{1-z}C1_z)_4O_{15+\alpha}$, in which "A1" includes one or more selected from the group consisting of Mg, Ca, and Sr, "B1" includes one or more selected from the group consisting of Ti and Hf, "C1" includes Ta, "x" is 0.50 or less, "y" is 0.50 or less, and "z" is 0.50 or less.

3. The dielectric composition according to claim 1, wherein a density of the dielectric composition is 4.40 g/cm³ or more.

4. An electronic component comprising a dielectric layer including the dielectric composition according to claim 1, and an electrode layer.

* * * * *